Oct. 25, 1966  R. DOMINGUEZ (AGURCIA)  3,280,461
GRAPHICAL DATA CONVERSION APPARATUS
Filed Oct. 28, 1964  3 Sheets-Sheet 1

Roberto Dominguez (Agurcia)
INVENTOR.

BY Clarence A. O'Brien
and Harvey B. Jacobson
Attorneys

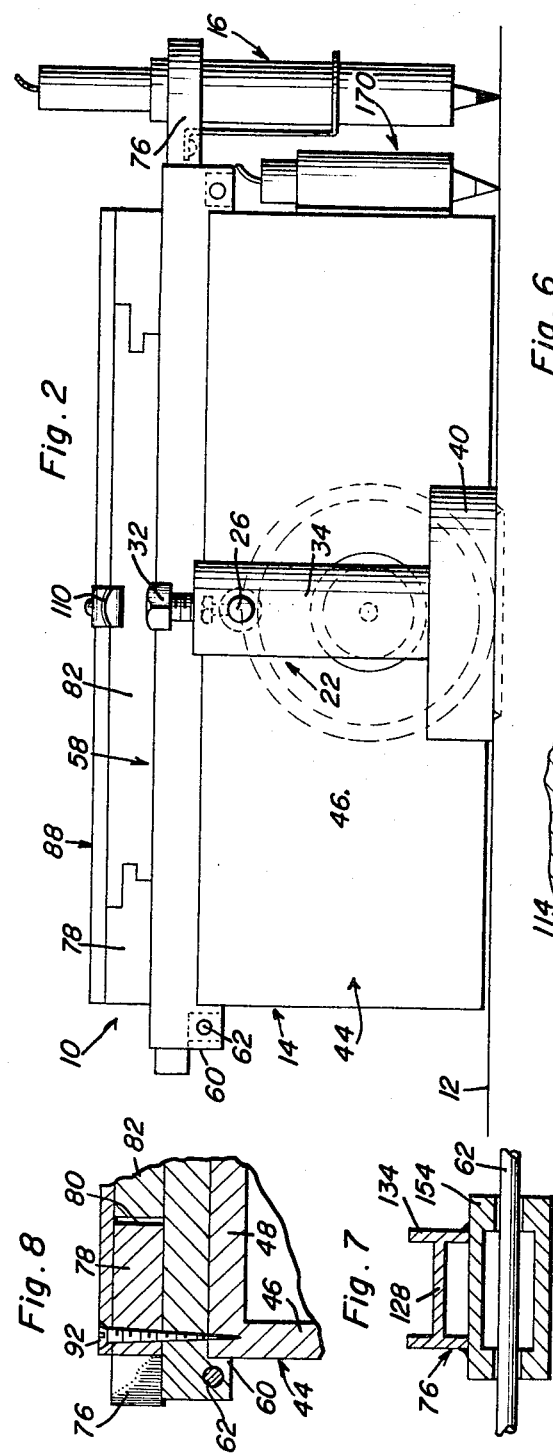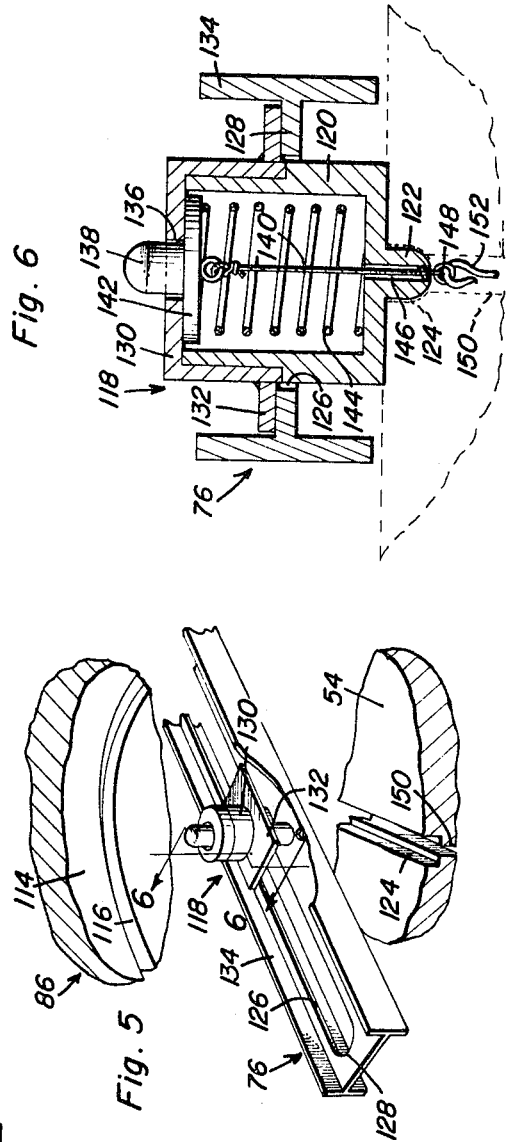
Roberto Dominguez (Agurcia)
INVENTOR.

Oct. 25, 1966 R. DOMINGUEZ (AGURCIA) 3,280,461
GRAPHICAL DATA CONVERSION APPARATUS
Filed Oct. 28, 1964
3 Sheets-Sheet 3
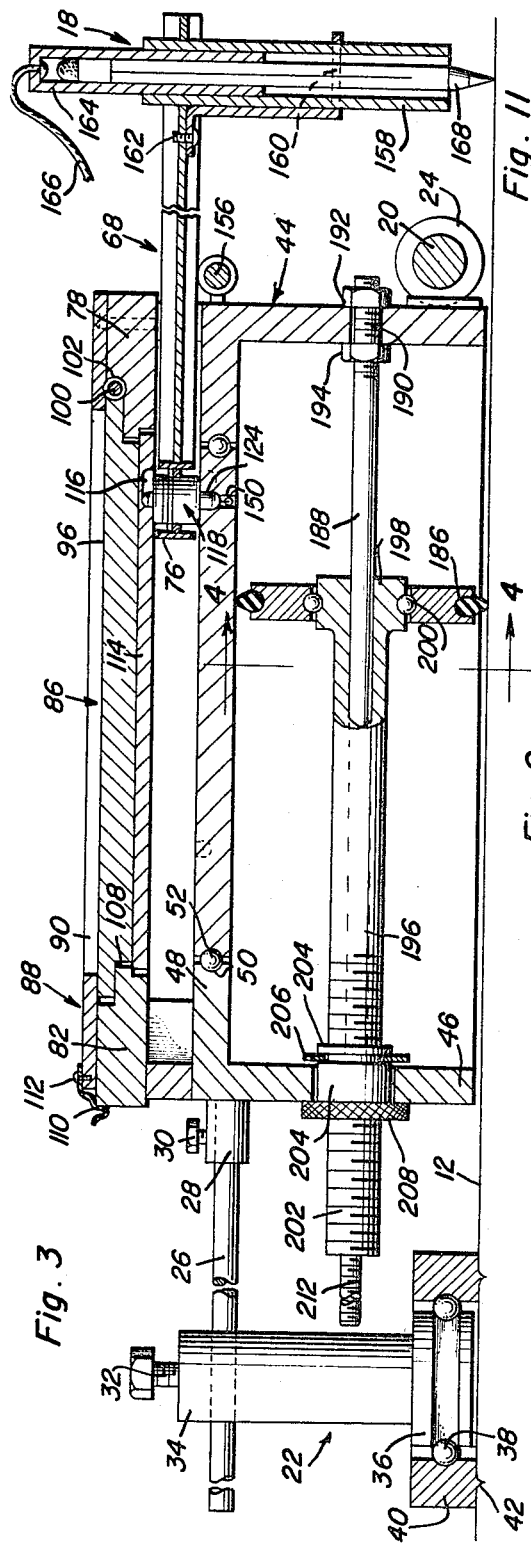
Roberto Dominguez (Agurcia)
INVENTOR.
BY Clarence A. O'Brien
and Harvey B. Jacobson
Attorneys United States Patent Office 3,280,461
Patented Oct. 25, 1966

3,280,461
GRAPHICAL DATA CONVERSION APPARATUS
Roberto Dominguez (Agurcia), Comayaguela, Honduras
(Apartado Postal 131, Tegucigalpa, Honduras)
Filed Oct. 28, 1964, Ser. No. 407,070
19 Claims. (Cl. 33—18)

This invention relates to a graphical conversion device and more particularly to a device for plotting graphical data with respect to either polar or Cartesian coordinates.

The primary purpose of the present invention is to provide a drafting device for plotting curves with respect to Cartesian or rectangular coordinates based upon data traced on polar coordinates and vice versa. The foregoing objectives are achieved without any computation on the part of the operator, this computation being performed by the apparatus itself.

An additional object of the present invention is to provide a graphical plotting device effecting a conversion between polar and Cartesian cordinates so that a polar pattern for example may be transformed into a periodic curve on Cartesian coordinates with facilities provided for adjusting the plotting scale when effecting the conversion.

A further object of the present invention is to provide a graphical converting device as aforementioned which may readily accept a change in the data to be converted and may also be varied in its operational mode to plot converted data in accordance with different requirements.

In accordance with the foregoing objects, the graphical converting device of the present invention essentially involves a frame guidingly movable along a predetermined directrix over a plotting surface. In response to such linear movement of the frame over the plotting surface, rotation is imparted to a polarizing disk mounted by the frame. The rotation of the polarizing disk is effected at a constant ratio to the linear movement of the frame, the ratio being adjustably varied however in accordance with different plotting requirements. Rotation of the polarizing disk is transformed into slidable displacement of plotting beams mounted by the frame so that plotting styli carried by these beams may plot or trace a curve on the plotting surface with respect to Cartesian coordinates. This transformation causing displacement of the plotting beams is controlled by a polar data assembly fixedly mounted by the frame but angularly adjustable in position. The polar data assembly is therefore readily replaceable and is operative to either control the plotting of a curve on the plotting surface with respect to Cartesian coordinates or to plot a polar pattern on the polar data assembly when the plotting beam is used to trace an existing curve on the plotting surface.

Yet another object of the present invention is to provide a graphical converting device as aforementioned involving a novel construction through which assembly of the parts and adjustment of the device may be effected in an advantageous and unique manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an elevational view of the device as viewed from one side.

FIGURE 3 is a longitudinal sectional view through the device taken substantially through the plane indicated by section line 3—3 in FIGURE 1.

FIGURE 4 is a partial sectional view taken substantially through a plane indicated by section line 4—4 in FIGURE 3.

FIGURE 5 is a partial perspective view of disassembled portions of the device.

FIGURE 6 is an enlarged partial sectional view taken substantially through a plane indicated by section line 6—6 in FIGURE 5.

FIGURE 7 is a sectional view taken substantially through a plane indicated by section line 7—7 in FIGURE 1.

FIGURE 8 is a partial sectional view taken substantially through a plane indicated by section line 8—8 in FIGURE 1.

FIGURE 9 is a perspective view of the disassembled portions of the frame assembly of the present device.

FIGURE 10 is a graphical illustration of some of the geometrical relationships involved in the graphical converting device.

FIGURE 11 is an elevational view with parts shown in section of another form of plotting stylus utilized with the device of the present invention.

Figure 1:
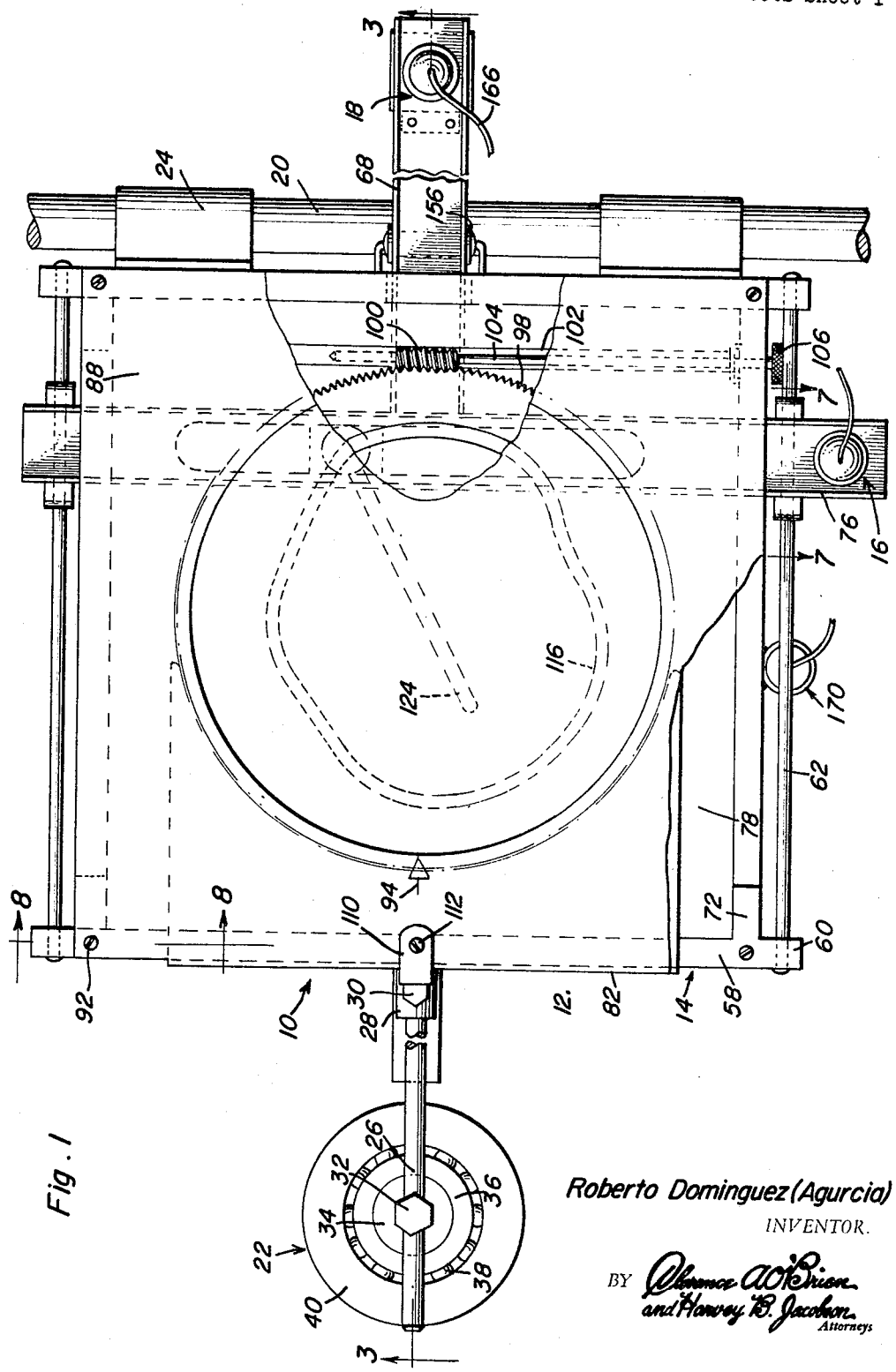
FIGURE 1 is a top plan view of the device of the present invention.

Referring now to the drawings in detail, it will be observed from FIGURES 1 and 2, that the device of the present invention generally denoted by reference numeral 10 is adapted to be guidingly moved over a plotting surface 12. All of the components of the device are carried by a frame assembly generally referred to by reference numeral 14, the frame assembly being manually moved along a predetermined directrix so that a curve may be plotted on the plotting surface 12 by means of the stylus assembly 16 or an existing curve on the plotting surface traced either by the stylus assembly 16 or by the stylus assembly 18. Both stylus assemblies 16 and 18 are carried by the frame assembly 14 for linear movement therewith as well as for movement relative to the frame assembly. Linear movement of the frame assembly along the aforementioned directrix may be predetermined either by a guide rod 20 fixedly mounted in any suitable fashion (not shown) to the plotting surface 12 or by the pivot assembly generally referred to by reference numeral 22 guidingly constraining linear movement of the frame assembly to an arc about a vertical axis established by the pivot assembly. It should be appreciated, that either the frame assembly is guided for linear movement in a straight line by the guide rod 20 or for curvilinear movement by the pivot assembly 22. Accordingly, when the guide rod 20 is utilized for guiding linear movement of the frame assembly in a straight line, the pivot assembly 22 is removed. The guide rod 20 may therefore be slidingly received through a pair of guide collars 24 secured to one side of the frame assembly. The pivot assembly 22 on the other hand, is adjustably secured to the frame assembly by means of a radius rod 26 received within a tubular extension 28 secured to the side of the frame assembly 14 opposite the side to which the guide collars 24 are secured. A setscrew 30 is provided so as to hold the rod 26 within the tubular extension 28 while a setscrew 32 secures the rod to the pivot assembly at any adjusted radial position on the rod. The pivot assembly therefore includes a vertical post 34 through which the rod 26 extends for engagement by the setscrew 32. An inner bearing race 36 is secured to the lower end of the post 34 for rotatable mounting by the ball bearing 38 within the base 40 as more clearly seen in FIGURE 3. Anchor points 42 are formed in the base 40 which also rotatably supports the inner race 36 in spaced relation above the plotting surface 12 so as to provide an antifriction support for the pivot assembly with its vertical axis aligned with a predetermined point on the plotting surface.

Referring now to FIGURES 3, 8 and 9 in particular it will be observed that the frame assembly 14 is composed of a downwardly open box-like base portion 44 supported slightly spaced above the plotting surface for guided movement thereabove as hereinbefore explained. The base portion 44 includes therefore, vertical side walls 46 connected to a top bearing support wall 48 within which a circular bearing race 50 is formed. The bearing race 50 therefore mounts ball bearings 52 providing rotatable support for a polarizing disk member 54 rotatable about a vertical axis fixed with respect to the frame assembly. Mounted on top of the base portion 44 is a spacing support assembly 56 which includes a support element 58 disposed on the base portion adjacent one side and having downwardly depending portions 60 supporting the ends of a pair of guide rods 62 by means of which the support element 58 is connected to a pair of support elements 64 seated on the base portion adjacent the opposite side. A gap 66 is formed between the support elements 64 so as to accommodate extension of an elongated plotting arm 68 which is movable relative to the frame assembly in a direction perpendicular to the direction of linear movement of the frame assembly. Wide gaps 70 are therefore formed between the extension 72 and 74 on the support elements 58 and 64 so as to accommodate slidable movement of an elongated plotting beam 76 to which the plotting arm 68 is connected intermediate the ends of the beam 76. The stylus assembly 16 is therefore mounted adjacent one end of the plotting beam 76 while the stylus assembly 18 is mounted adjacent one end of the plotting arm 68 beyond the frame assembly. Mounted on top of the spacing support assembly 56 in spaced relation to the base portion 44, is a receiving portion 78 provided with a U-shaped slot 80 adapted to receive a removable insert 82 which forms with the slot 80, an internally shouldered circular opening 84 adapted to receive a polar data assembly 86 as more clearly seen in FIGURE 3. Finally, the frame assembly is completed by a cover member 88 provided with a circular opening 90 through which the top surface of the polar data assembly 86 is exposed. A plurality of assembly fasteners 92 hold portions 44, 56 and 78 and 88 of the frame assembly in fixed assembled relation to each other. The cover portion 88 may also be provided with an index pointer 94 by means of which the angular position of the data assembly 86 may be gauged.

The data assembly as more clearly seen in FIGURES 1 and 3, includes an upper portion 96 exposed through the opening 90 in the cover member 88 which is provided with scaled gradations for indicating the angular position of the data assembly 86 within the frame assembly. The upper portion 96 is also formed with an annular gear formation 98 arranged when assembled within the frame assembly to mesh with a worm 100 rotatably mounted within an opening 102 formed in the frame portion 78 for such purpose. The worm is connected to an adjustment shaft 104 which extends through the opening 102 and is connected at an end which projects beyond the frame assembly, to an adjustment knob 106. It will therefore be apparent, that rotational adjustment may be imparted by the worm 100 to the data assembly seated within the U-shaped opening 80 of the frame portion 78. An intermediate portion of the data assembly 86 is therefore provided with an annular bearing portion 108 supported by the shouldered opening 84 of the frame portion 78 and by the insert 82. The insert 82 may therefore be releasably held in position by a spring element 110 fixed to the cover member 88 by the fastener 112. The insert 82 may therefore be withdrawn in order to remove and replace the polar data assembly 86. The data assembly also includes a pattern disk portion 114 having a lower surface bearing a polar curve pattern in the form of the curved groove 116 as illustrated in FIGURES 1 and 3.

The polar pattern groove 116 controls sliding movement of the plotting beam 76 and plotting arm 68 connected thereto, in conjunction with the rotational movement imparted to the polarizing disk member 54. The plotting beam 76 therefore slidingly mounts a motion transformer unit generally referred to by reference numeral 118 as more clearly seen in FIGURES 5 and 6. The unit 118 includes a cup-like guide element 120 having a downwardly extending projection 122 received within a radial guide slot 124 formed in the polarizing disk member 54 so as to impart slidable displacement to the unit 118 in response to rotation of the polarizing disk member. The slide element 120 is therefore slidingly mounted within a slot 126 formed in the web portion 128 of the plotting beam 76. The guide element is also provided with a cover portion 130 to which a guide plate 132 is secured as by welding and is supported on the web portion 128 of the plotting beam between the flanges 134. A central opening 136 is formed on the cover portion 130 through which a pin 138 projects for engagement with the polar pattern groove 116 formed in the pattern disk portion 114 of the data assembly 86. It will therefore be apparent, that while rotational movement of the disk member 54 will impart sliding movement to the unit 118 relative to the plotting beam 76, the constraint imposed on the unit 118 by the polar pattern groove 116 will cause slidable displacement of the plotting beam 76 in a direction perpendicular to the instantaneous direction of movement of the frame assembly because of the guiding restraint imposed on the plotting beam by the guide rods 62. When desired, the pin 138 may be withdrawn from engagement with the groove 116 by means of a flexible element 140 secured at its upper end to an abutment disk 142 to which the pin 138 is connected so as to prevent its disassembly from the unit 118 under the bias of spring 144 yieldably holding the pin 138 in engagement within the groove 116. The flexible element 140 extends through bore 146 formed in projection 122 and is connected at its lower end to an eye element 148 which projects into a connecting slot 150 communicating with the radial groove 124 aforementioned. To withdraw the pin 138 from engagement with the groove 116, a hook 152 may be inserted into the slot 150 in order to engage the eye element 158 so that a pull may be exerted on the flexible element 140. Withdrawal of the pin 138 from the groove 116 will of course be necessary when replacing the polar data assembly 86.

Displacement of the plotting beam 76 relative to the frame assembly is guided by the guide rods 62 received through guide collars 154 secured as by welding to the bottom of the plotting beam 76 adjacent opposite ends thereof as more clearly seen in FIGURE 7. Also, guiding support for the plotting arm 68 is provided by the guide roller 156 rotatably mounted by the base portion 44 of the frame assembly. The stylus assemblies 16 and 18 mounted on the plotting beam 76 and the plotting arm 68 are similar in construction. As more clearly seen in FIGURE 3, the stylus assembly 18 for example includes a tubular member 158 extending through an opening in the web portion of the plotting arm 68 and secured in place by means of the bracket 160 also secured to the web portion by means of the fasteners 162. A cap 164 is slidably received within the tubular member 158 and may be withdrawn therefrom by means of a string 166 attached to the upper end thereof. A stylus plotting member such as the pencils 168 may therefore be frictionally retained within the cap 164. Another stylus assembly 170 may also be fixedly mounted on the frame assembly so as to plot a reference line, when movement is being imparted to the frame assembly. The cap mounted pencils associated with the stylus assemblies 16, 18 and 170 could of course be removed and replaced by other plotting facilities such as a chalking element 172 as shown in FIGURE 11 engageable for example with a slate-type of plotting surface 12'. The chalk element 172 may therefore be spring biased into engagement with the surface 12' by the spring element 174 housed within the tubular member 176. A closure cap 178 may be retained at the upper end of the tubular member 176 by the bayonet slot 180 receiving a laterally projecting pin 182 on the cap which provides an abutment for the end of the spring 174 opposite the chalk element 172. The chalk marking device illustrated in FIGURE 11 may therefore be inserted within the tubular housing member 158 associated with the stylus assembly 18 for example in lieu of the cap mounted pencils as illustrated in FIGURES 2 and 3.

Rotation is imparted to the polarizing disk member 54 in response to guided linear movement of the frame assembly by means of a drive wheel 184 as more clearly seen in FIGURE 3. The drive wheel includes an annular friction rim 186 peripherally engaged with the plotting surface 12 and the undersurface of the disk member 54. The friction drive wheel is rotatably supported by the frame assembly about a rotational axis extending through a stud axle 188 fixed to a side wall 46 of the base portion 44 of the frame assembly. The stud axle is therefore provided with an externally threaded end portion 190 received through an opening in the side wall of the base portion 44 and locked in position by the lock nuts 192 and 194 so as to establish the rotational axis for the drive wheel extending in a direction perpendicular to the direction of linear movement imparted to the frame assembly. Accordingly, movement imparted to the frame assembly will cause the drive wheel to roll about its rotational axis because of its engagement with the plotting surface 12 holding the frame assembly slightly spaced above the plotting surface. This roation will be communicated to the disk member 54 so as to impart rotation thereto about its vertical rotational axis. The drive ratio between the linear movement of the frame assembly and the rotation of the disk member 54 will therefore depend upon the radial position of the drive wheel 184 relative to the disk member 54, the rotational axis of which must therefore intersect the axis extending through the stud axle 188. Accordingly, the drive wheel 184 must be axially shiftable along the axle 188 and toward this end, a sleeve 196 is slidably mounted on the axle 188 and is provided at one end with a hub 198 forming an inner race for the ball bearings 200 on which the drive wheel 184 is rotatably mounted. The opposite end portion 202 of the sleeve 196 is externally threaded so as to be threadedly received within the adjustment nut 204. The adjustment nut is rotatably mounted within an opening in the side wall 46 of the base portion 44 of the frame assembly and held assembled therein by a spring retainer element 206. An externally knurled adjustment knob 208 is connected to the nut member 204 so that it may be rotated in order to impart axial movement to the sleeve 196 in order to adjust the radial position of the friction drive wheel 184. The axle 188 is also provided with a scale extension portion 212 which projects beyond the sleeve 196 so that the axial position of the drive wheel may be gauged. It will therefore be apparent, that a drive ratio control device is provided so as to adjustably set a constant ratio between linear movement of the frame assembly and rotation of the polarizing disk member 54.

From the foregoing description, it will be apparent that movement imparted to the frame assembly 14 along a straight line when guided for example by the guide rod 20 would impart movement to the stylus assembly 16 along one axis so that when it has moved from a starting point 0 as diagrammatically depicted in FIGURE 10 for example, by a distance X to a point 0' along the X-axis, the radial slot 124 in the polarizing disk member 54 will undergo rotation of $\theta$ degrees. Linear displacement of any point on the radial slot on the disk member 54 will however be proportional to the linear displacement of the frame assembly along the X-axis in accordance with the constant drive ratio factor R determined by the axial position of the drive wheel 184 as aforementioned. Accordingly, $X = R\theta$ where X equals the displacement of the frame assembly along the X-axis, R equals the constant ratio or radial position of the drive wheel and $\theta$ equals the angle displacement of the polarizing disk member 54. The position occupied by the transformer unit 118 along the radial slot however depends upon the polar pattern groove 116. The radial distance ($r$) of the unit 118 from the rotational center of the disk member 54 will therefore be some function of r from which the displacement y corresponding to the displacement x is predetermined. It will therefore be apparent that linear displacement of the frame assembly parallel to the X-axis or any other directrix will be proportional to one of the polar coordinates corresponding to the polar pattern formed by the groove 116. The resulting displacement of the plotting beam 76 along the Y-axis will therefore correspond to the function of $\theta$ represented by the polar pattern since the transformation between polar and Cartesian coordinates along the Y-axis is expressed by $y = r \sin \theta$. Thus, it will be apparent that operation of the graphical converting device will effect a conversion of a polar pattern or curve from polar coordinates to Cartesian coordinates plotted by displacement of the stylus assembly 16 because of its displacement along the Y-axis when the frame assembly is displaced along the X-axis. An existing curve previously plotted on the plotting surface 12 could similarly be utilized to trace a polar diagram on the polar data assembly 86 from a curve on the surface 12. In such case, the grooved pattern disk portion 114 would be replaced by a flat disk having carbon paper overlying tracing paper for example, so that the pin 138 yieldably engaged therewith may trace the polar diagram corresponding to the curve on the plotting surface 12. The stylus assembly 18 on the plotting arm 68 could be utilized to trace the curve on the plotting surface 12 by movement thereof along both the X and Y axis causing relative movement between the plotting arm 68 and the frame assembly and movement of the frame assembly relative to the plotting surface 12 resulting in rotation of the disk member 54 and corresponding movement of the transformer unit 118 tracing the polar diagram.

It should therefore be apparent from the foregoing, that many uses for the graphical conversion device will be available for educational and scientific research purposes as well as for decorative graphing purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is clamed as new is as follows:

1. A device for converting graphical data between polar and Cartesian coordinates comprising, a frame, means for guiding linear movement of the frame along a predetermined directrix parallel to a plotting surface, polarizing means rotatably mounted by the frame, drive means responsive to said linear movement of the frame for rotating the polarizing means at a constant ratio to said linear movement, plotting means guidingly mounted by the frame for tracing a curve on the plotting surface, polar data means fixedly mounted on the frame; and transforming means engageable with the plotting means and the polar data means for correlating said curve on the plotting surface with a polar pattern on the polar data means.

2. The combination of claim 1 including ratio control means operatively connected to the drive means for adjustably varying said constant ratio.

3. The combination of claim 2 including adjustment means drivingly engageable with the polar data means for varying the angular position thereof relative to the frame.

4. The combination of claim 3 wherein said plotting means comprises, an elongated beam, means slidably mounting the beam in the frame for displacement relative thereto in a direction perpendicular to the instantaneous direction of linear movement of the frame, and a tracing stylus mounted by the beam for contact with the plotting surface.

5. The combination of claim 4 wherein said drive means comprises, a drive wheel peripherally engaged with said plotting surface and the polarizing means, and means rotatably mounting the drive wheel on the frame for rotation about a rotational axis perpendicular to the direction of linear movement of the frame.

6. The combination of claim 5 wherein said ratio control means comprises, shifting means engageable with the drive wheel for axial displacement thereof along the rotational axis, and gauging means mounted by the frame for indicating the radial position of the drive wheel in relation to the polarizing means.

7. The combination of claim 6 wherein said transforming means comprises, a slide element slidably mounted by the plotting means for displacement in the direction of linear movement of the frame, radial guide means engageable with the polarizing means for inducing said displacement of the slide element in response to rotation of the polarizing means relative to the frame, and yieldable tracing means mounted by the slide element for contact with the data means along said polar pattern.

8. The combination of claim 7 including flexible means connected to said yieldable tracing means for selective withdrawal thereof from contact with the polar data means.

9. The combination of claim 8 wherein said frame comprises, a base portion having bearing means for rotatably mounting the polarizing means in engagement with the drive means, a spacing assembly mounted on the base portion and carrying said slidable mounting means for the beam of the plotting means, a data receiving portion mounted on the spacing assembly in spaced relation to the polarizing means including a removable insert, and a cover portion mounted on the data receiving portion for holding the polar data means assembled therein.

10. The combination of claim 9 wherein said polar data means comprises, an annular gear portion engageable with said adjustment means for angular positioning thereof, a bearing portion guidingly engaged with the data receiving portion of the frame, and a pattern portion fixed to the bearing portion and having a surface bearing said polar pattern.

11. The combination of claim 1 including adjustment means drivingly engageable with the polar data means for varying the angular position thereof relative to the frame.

12. The combination of claim 11 wherein said polar data means comprises, an annular gear portion engageable with said adjustment means for angular positioning thereof, a bearing portion guidingly engaged with the data receiving portion of the frame, and a pattern portion fixed to the bearing portion and having a surface bearing said polar pattern.

13. The combination of claim 1 wherein said plotting means comprises, an elongated beam, means slidably mounting the beam in the frame for displacement relative thereto in a direction perpendicular to the instantaneous direction of linear movement of the frame, and a tracing stylus mounted by the beam for contact with the plotting surface.

14. The combination of claim 13 wherein said frame comprises, a base portion having bearing means for rotatably mounting the polarizing means in engagement with the drive means, a spacing assembly mounted on the base portion and carrying said slidable mounting means for the beam of the plotting means, a data receiving portion mounted on the spacing assembly in spaced relation to the polarizing means including a removable insert, and a cover portion mounted on the data receiving portion for holding the polar data means assembled therein.

15. The combination of claim 1 wherein said drive means comprises, a drive wheel peripherally engaged with said plotting surface and the polarizing means, and means rotatably mounting the drive wheel on the frame for rotation about a rotational axis perpendicular to the direction of linear movement of the frame.

16. The combination of claim 15 including shifting means engageable with the drive wheel for axial displacement thereof along the rotational axis, and gauging means mounted by the frame for indicating the radial position of the drive wheel in relation to the polarizing means.

17. The combination of claim 1 wherein said transforming means comprises, a slide element slidably mounted by the plotting means for displacement in the direction of linear movement of the frame, radial guide means engageable with the polarizing means for inducing said displacement of the slide element in response to rotation of the polarizing means relative to the frame, and yieldable tracing means mounted by the slide element for contact with the data means along said polar pattern.

18. The combination of claim 17 including flexible means connected to said yieldable tracing means for selective withdrawal thereof from contact with the polar data means.

19. A device for converting graphical data between polar and Cartesian coordinates comprising, a frame, means for guiding linear movement of the frame along a predetermined directrix parallel to a plotting surface, polarizing means rotatably mounted by the frame, drive means responsive to said linear movement of the frame for rotating the polarizing means, plotting means guidingly mounted by the frame for contact with the plotting surface, polar data means fixedly mounted on the frame and having a pattern surface, and transforming means engageable with the plotting means and the polar data means for plotting graphical data on one of said surfaces by tracing a curve on the other of said surfaces.

No references cited.

LEONARD FORMAN, *Primary Examiner.*